United States Patent
Boe et al.

(10) Patent No.: US 9,834,282 B2
(45) Date of Patent: Dec. 5, 2017

(54) BEARING SYSTEM FOR TURRET ON A VESSEL

(71) Applicant: Framo Engineering AS, Bergen (NO)

(72) Inventors: Ketil Boe, Fana (NO); Stig Skauge, Ulset (NO); Lars Seim, Haukeland (NO)

(73) Assignee: Framo Engineering AS, Bergen (NO)

( * ) Notice: Subject to any disclaimer, the term of this patent is extended or adjusted under 35 U.S.C. 154(b) by 0 days.

(21) Appl. No.: 14/784,833

(22) PCT Filed: Apr. 17, 2014

(86) PCT No.: PCT/US2014/034553
§ 371 (c)(1),
(2) Date: Oct. 15, 2015

(87) PCT Pub. No.: WO2014/172570
PCT Pub. Date: Oct. 23, 2014

(65) Prior Publication Data
US 2016/0083049 A1   Mar. 24, 2016

Related U.S. Application Data

(60) Provisional application No. 61/813,194, filed on Apr. 18, 2013.

(51) Int. Cl.
| | |
|---|---|
| *F16C 27/04* | (2006.01) |
| *F16C 19/50* | (2006.01) |
| *B63B 21/50* | (2006.01) |
| *B63B 35/44* | (2006.01) |
| *B63B 22/02* | (2006.01) |

(52) U.S. Cl.
CPC .......... *B63B 21/507* (2013.01); *B63B 22/021* (2013.01); *B63B 35/4413* (2013.01); *F16C 19/507* (2013.01); *F16C 27/04* (2013.01); *B63B 2022/028* (2013.01); *F16C 2300/14* (2013.01);
(Continued)

(58) Field of Classification Search
CPC .... F16C 19/507; F16C 27/04; F16C 2300/14; F16C 2326/00; F16C 2326/30; F16C 19/546; F16C 41/02; F16H 19/545; B63B 21/507; B63B 22/21; B63B 35/4413; B63B 2022/14; Y10T 29/49679
USPC ....... 384/127, 247, 256, 452, 455, 559, 618; 114/230.12; 441/3; 166/354, 355
See application file for complete search history.

(56) References Cited

U.S. PATENT DOCUMENTS 4,561,815 A    12/1985  Trevarrow
4,698,038 A  * 10/1987  Key ..................... B63B 21/507
                                                   114/264
(Continued)

FOREIGN PATENT DOCUMENTS

| EP | 1889779 A1 * | 2/2008 | ........... B63B 21/507 |
| GB | 578152 A * | 6/1946 | .............. F16C 19/50 |
| WO | WO-2013055291 A1 * | 4/2013 | ........... B63B 21/507 |

OTHER PUBLICATIONS

International Patent Application No. PCT/US2014/034553 International Search Report and Written Opinion dated Nov. 7, 2014 (20 pages).

*Primary Examiner* — Marcus Charles
(74) *Attorney, Agent, or Firm* — Conley Rose, P.C.

(57) ABSTRACT

A bearing system including a wheel assembly transmitting load to a damping assembly, wherein the wheel assembly is configured to rotate angularly relative to the damping assembly.

13 Claims, 12 Drawing Sheets

(52) U.S. Cl.
CPC ...... *F16C 2326/00* (2013.01); *F16C 2326/30* (2013.01); *Y10T 29/49679* (2015.01)

(56) References Cited

U.S. PATENT DOCUMENTS

| | | | | |
|---|---|---|---|---|
| 4,753,553 | A | * | 6/1988 | Carlsen ................. B63B 21/507 |
| | | | | 114/230.12 |
| 5,007,314 | A | * | 4/1991 | Hafla ...................... B23B 3/161 |
| | | | | 82/120 |
| 5,356,321 | A | | 10/1994 | Boatman et al. |
| 5,746,148 | A | | 5/1998 | Delago |
| 5,860,382 | A | | 1/1999 | Hobdy |
| 6,269,762 | B1 | * | 8/2001 | Commandeur ....... B63B 21/507 |
| | | | | 114/230.12 |
| 6,477,974 | B2 | | 11/2002 | Hobdy |
| 8,950,349 | B2 | * | 2/2015 | Lindblade ............... F16C 21/00 |
| | | | | 114/230.12 |
| 2004/0261683 | A1 | | 12/2004 | Lindblade et al. |
| 2007/0264889 | A1 | | 11/2007 | Boatman et al. |
| 2008/0216541 | A1 | * | 9/2008 | Fudulu .................... B21D 5/08 |
| | | | | 72/181 |
| 2008/0267716 | A1 | | 10/2008 | D'Souza et al. |
| 2014/0050428 | A1 | * | 2/2014 | Lindblade ............... F16C 21/00 |
| | | | | 384/127 |

\* cited by examiner

BEARING SYSTEM FOR TURRET ON A VESSEL

CROSS-REFERENCE TO RELATED APPLICATIONS

This patent application claims the benefit of: U.S. Prov. Ser. No. 61/813,194 filed Apr. 18, 2013, and entitled "A Bearing System", and International Application Ser. No. PCT/US2014/034553, filed Apr. 17, 2014, and entitled "Bearing System For Turret On A Vessel," the contents of each being incorporated herein by reference in their entireties for all purposes.

TECHNICAL FIELD

The present disclosure relates generally to vessels such as for offshore drilling or production vessels. More particularly, the present disclosure relates to a bearing system for turrets on such vessels and a method of installing bearing systems onto such vessels.

BACKGROUND

A bearing is generally defined as a device for positioning one element relative to another in such a manner that relative movement between the elements is possible. The elements have respective bearing surfaces, which are in contact with each other.

Bearings are generally employed in order to absorb loads and/or support one or more elements. The element may be rotating, for example a rotating shaft, or it may be fixed, for example a bridge or the like. A bearing may also be designed to be able to absorb both axial and radial forces. The bearing type should be chosen based on its anticipated application.

If there are large loads in a structure, where there has to be a movement between elements therein and where external influences result in fluctuating loads in the structure and its bearings, slide bearings, for example, may be employed.

The use is known also of various types of devices for supporting a turret on a vessel, for example a Floating Production, Storage and Offloading Vessel (FPSO), where these may be slide bearings, roller bearings or wheel suspension. A vessel of this type can be exposed to substantial wind, current and wave influences.

When harsh wind and wave impact occurs on a FPSO, the turret is pressed against the radial turret bearings. This movement and the vessels hog, sag and ovality/tolerances make it necessary to have some kind of radial flexibility on the wheels of a wheel bearing system. This ensures that the distribution of the radial loads is taken on many wheels, not only overloaded onto one or two wheels. A known design is to mount and spring load wheels, such as described in U.S. Pat. No. 5,860,382. The described structure has a spring-loaded wheel in a box assembly, with a spring rod fixed horizontally and vertically to the box assembly. The outer guiding of the box assembly is done by brackets or slots in the surrounding ship structure, or with large steel sections around the rotatable turret rail. And the spring rod is fastened to a lid that has to be bolted to the surrounding structure. This type of arrangement uses a fine alignment between the box assembly and the spring rod, and also has fine tolerances in the surrounding structure. The radial loads to go through the lid bolts, even when the springs are totally compressed and extreme stemming loads occur.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An object, according to some embodiments, is to provide a bearing having relatively large internal tolerances in a preassembled system.

According to some embodiments, an object is also to provide a robust bearing system that can be quickly mounted to a ship interface and easily adjusted with respect to the interface.

According to some embodiments, another object is to provide a system that leads large radial and/or axial loads through wedges into the ship interface structure. Such systems avoid large forces and shear loads on interface bolts, which also leads to fewer interface bolts used.

According to some embodiments, when the spring rod of the bearing is compressed (stemmed), any additional load goes through the outer housing/wedges and not through any internal system bolts.

According to some embodiments, the bearing system is a wheel bearing system. Such bearing systems may be used on turrets for FPSOs. In one example, the bearing system may be used as radial bearings. In another example, the bearing system may be used as axial bearings.

According to some embodiments, a bearing system is described that is configured to support rotation of a turret carried by a vessel. The rotation of the turret relative to the vessel is about a substantially vertical turret axis. The bearing system includes a plurality of bearing assemblies. Each bearing assembly includes: a roller in contact with the turret bearing surface; a linkage system configured to transmit force from the bearing surface toward the roller into a supporting structure of the vessel; and a mounting system configured to securely mount the bearing assembly to the supporting structure. The mounting system includes one or more wedge-shaped members shaped so as to provide precise positioning of the bearing assembly with respect to the supporting structure and positioned so as to facilitate transmission of force from the linkage system to the supporting structure. According to some embodiments, the bearing assembly is a substantially prefabricated cartridge-type subassembly configured for easy installation and/or removal from the supporting structure. According to some embodiments, the linkage system includes a compression spring system configured to allow movement of the roller in a direction perpendicular to the bearing surface. According to some embodiments, the linkage system is configured such that when the spring system is compressed to its maximum position, further force from the bearing surface towards the roller passes directly through the linkage system to the supporting structure without increasing a load on the spring system end piece. According to some embodiments, the linkage system includes one or more linkage elements (e.g. spherical bearings) configured to allow freedom of movement of linkage elements in directions parallel to the turret bearing surface, thereby facilitating manufacture and/or assembly of the bearing assembly.

According to some embodiments, the bearing assemblies are axial bearing assemblies, and according to other embodiments, the bearing assemblies are radial bearing assemblies. According to some embodiments, the mounting system includes one or more slidably mating thread-free mounting elements (e.g. tongue and groove elements) configured to restrain movement of at least a front portion of the bearing assembly with respect to the supporting structure.

According to some embodiments each of the bearing assemblies includes: a roller in contact with the turret bearing surface; a linkage system configured to transmit force from the bearing surface toward the roller into a supporting structure of the vessel, the linkage system comprising one or more linkage elements configured to allow freedom of movement of linkage elements in directions parallel to the turret bearing surface in a location contacted by the roller, the freedom of movement facilitating manufacture and/or assembly of the bearing assembly; and a mounting system configured to securely mount the bearing assembly to the supporting structure.

According to some embodiments, a method is described for installing a bearing system configured to support rotating of a turret carried by a vessel. The method includes: placing a prefabricated bearing assembly onto a supporting structure of the vessel; sliding the placed bearing assembly towards the bearing surface; inserting one or more wedge-shaped members into one more openings in the supporting structure; and adjusting the position of the bearing assembly with respect to the supporting structure and to the bearing surface by modifying the vertical position of the one or more wedge-shaped members. The wedge-shaped members are also positioned and configured to facilitate transmission of force from the linkage system to the supporting structure. According to some embodiments, after the adjusting of the position of the bearing assembly, the bearing assembly is fastened to the supporting structure using a plurality of bolt fasteners. According to some embodiments, the method also includes installing one or more shim pieces in proximity to the wedge-shaped members so as to aid in the adjusting the position of the bearing assembly.

According to some embodiments, a bearing system is described that includes a wheel assembly configured to transmit loads to a damping assembly via connecting means, wherein the connecting means enable angular rotation between the wheel assembly and the damping assembly.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIGS. 4-1 and 4-2 are cross sectional views illustrating aspects of a bearing cartridge used for supporting a rotatable turret on a vessel, according to some embodiments;

FIGS. 9-1, 9-2, 9-3 and 9-4 are perspective views showing further aspects of a cartridge support structure and vessel structure onto which a bearing cartridge can be mounted, according to some embodiments; and FIGS. 10-1, 10-2, 10-3 and 10-4 are perspective views showing further aspects of mounting a bearing cartridge to a support structure in a vessel, according to some embodiments.

DETAILED DESCRIPTION

The particulars shown herein are by way of example and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

Figure 1:
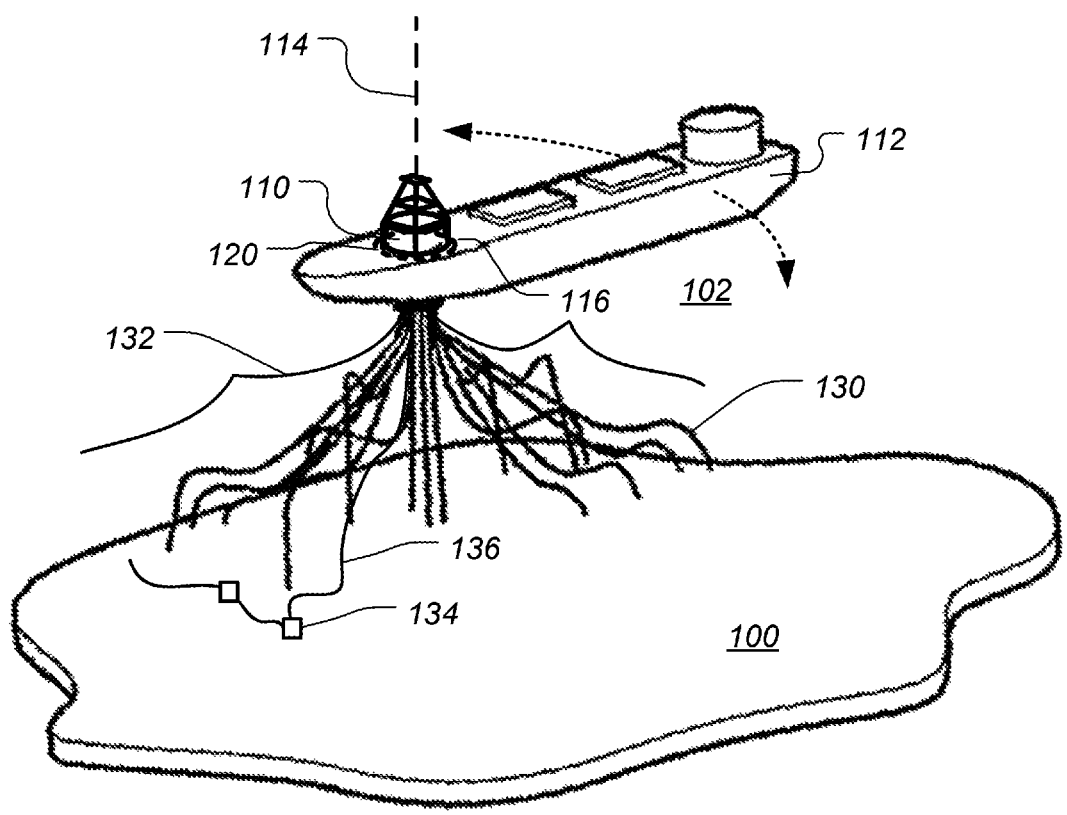
FIG. 1 is a diagram illustrating a vessel supporting a turret using a bearing system, according to some embodiments.

FIG. 1 is a diagram illustrating a vessel supporting a turret using a bearing system, according to some embodiments. Vessel 112 is shown on the surface of seawater 102. According to some examples, vessel 112 is a Floating Production, Storage and Offloading Vessel (FPSO) configured to receive hydrocarbons produced from subsea subterranean reservoirs, to processing and/or store the received hydrocarbons. Vessel 112 includes turret 110 and is supported by a surrounding vessel structure 116. The bearing system 120 can include slide bearings, roller bearings and/or wheel suspensions.

Vessel 112 can be exposed to substantial wind, current and wave influences. When harsh wind and wave impact occurs on vessel 112, the turret 110 is pressed against the radial turret bearings, which form part of the bearing system 120. In many designs a certain amount of radial flexibility on the bearing system 120 is highly beneficial to accommodate such movements along with the vessel's hog, sag and ovality/tolerances. Such radial flexibility ensures that the distribution of the radial loads is taken on many wheels, rather than overloaded on any one or two wheels.

According to some embodiments, bearing system 120 includes a plurality of wheel bearing cartridges to support rotatable turret 110 on FPSO 112 that allow the FPSO 112 to weathervane 360° around vertical turret axis 114, as shown by the dotted arrows. Risers 130 and the anchor chains 132 are locked to the lower part of turret 110. According to some embodiments, rotating turret 110 is also used to supply umbilical 136 to subsea system 134 which can be, for example, a subsea pump and/or compressor.

Figure 2:
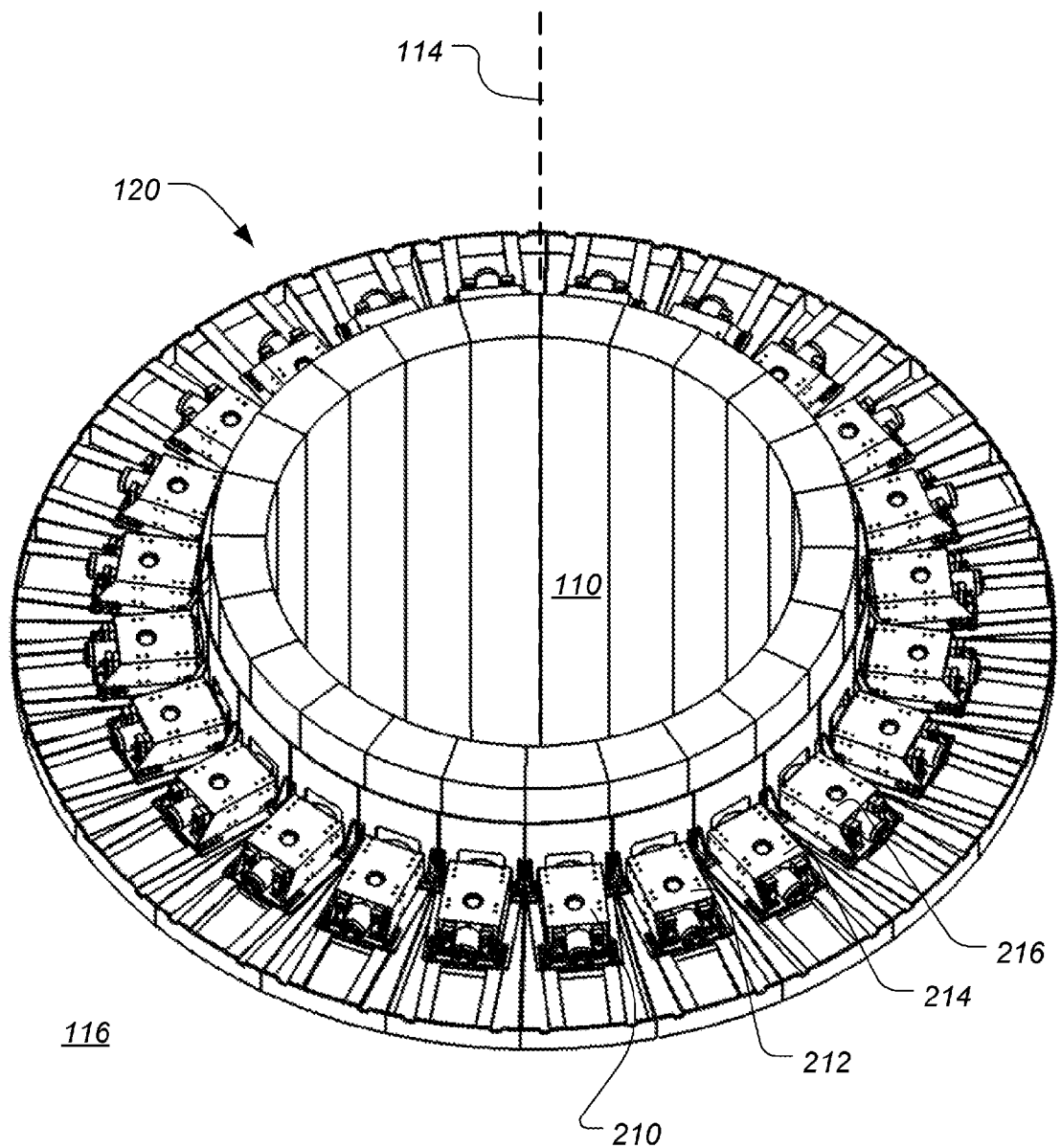
FIG. 2 is a perspective view showing a bearing system for a rotatable turret, according to some embodiments.

FIG. 2 is a perspective view showing a bearing system for a rotatable turret, according to some embodiments. In the example shown, bearing system 120 includes a total of 24 bearing cartridges, such as bearing cartridges 210, 212, 214 and 216, which are placed around a rotatable turret 110 (a portion of which is shown). Although 24 bearing cartridges are shown in this example, the number of cartridges will vary from ship to ship. According to some alternative embodiments, groups of cartridges can be radially spread out instead of evenly spaced, as shown. For purposes of clarity, portions of the rotatable turret 110 are not shown, and the structural ship walls between the cartridges are not shown in full height.

Figure 3:
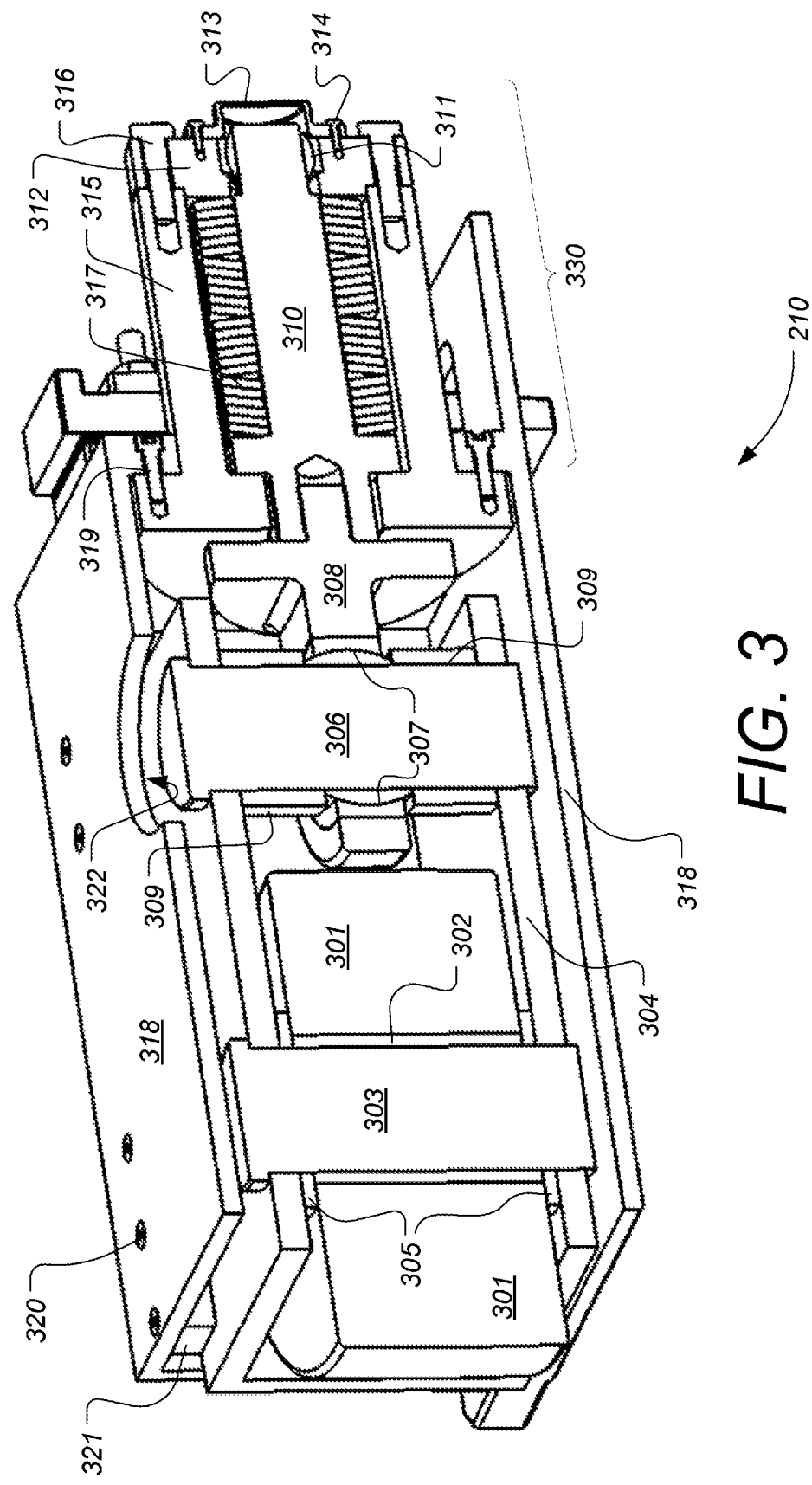
FIG. 3 is a cross-section view of a bearing cartridge used for supporting a rotatable turret on a vessel, according to some embodiments.

FIG. 3 is a cross-section view of a bearing cartridge (e.g., bearing cartridge 210) used for supporting a rotatable turret on a vessel, according to some embodiments. In the example shown, bearing cartridge cartridge 210 includes a fixed (to ship or receiving structure) outer housing with an inner moving wheel assembly box and a disc spring or damping system. When used in an FPSO, the horizontal turret movement/loads/ovality can push the inner wheel/box assembly radially away from turret center so as to compress the damping assembly.

As shown in FIG. 3, a wheel 301 with a radial plain bearing 302 is on a wheel shaft 303. The wheel shaft 303 and radial plain bearing 302 are fixed inside inner box 304 by axial plain bearings 305 on the top of and under the wheel 301. According to some alternative embodiments, roller bearing can be used instead of one or more of the plain bearings shown. The inner box 304 is open to the front side (the side facing the turret center, when installed) and to the back side (the side away from the turret center, when installed).

A spring shaft 306 is placed behind the wheel and is also fixed on the top and bottom to the box 304. A first spherical bearing 307 and a rod end 308 are placed on the spring shaft 306. The first spherical bearing 307 is fixed vertically in the inner box 304 by two thin pipes 309. In this example, one of the pipes 309 is placed over the first spherical bearing 307 and the other is placed below bearing 307.

According to some embodiments, the rod end 308 is fastened and/or threaded to a damping assembly via a spring rod 310. A second spherical bearing 311 is placed on the back end of the spring rod 310. The second spherical bearing 311 is fixed in a spring housing lid 312 and a cover 313. The cover 313 can be fastened to the spring housing lid 312, for example, by bolts 314. The spring housing lid 312 can be fastened to a spring housing 315 by bolts 316. According to some embodiments, the damping assembly 330 includes a number of disc springs 317 that are placed on the spring rod 310. The disc springs 317 can be arranged in any of a number of different ways on the spring rod 310 depending on the purpose as will be known by one skilled in the art. Alternatively, different disc types (e.g. differing in thickness, shape and/or material) can also be combined on the same rod assembly 310. The disc springs 317 and spring rod 310 can be designed to be preloaded or not, depending on the particular application. According to some alternative embodiments to disk springs 317, conventional compression springs, elastomers or different combinations of these three types can be used. According to some alternative embodiments, the damping system 330 might comprise a piston rod (instead of the spring rod 310) and use hydraulics to obtain and/or apply loads so to exert damping effect. The spring housing 315 is fastened to an outer housing 318 by, for example, bolts 319.

In the example shown in FIG. 3, the spring rod assembly is thus freely hinged (using spherical bearings 307 and 311) both within box 304 and within spring housing 315. It has been found that providing such freedom of movement enables parts of the bearing cartridge 210 to have substantially rougher tolerances. For example, the various parts do not have to be perfectly aligned when assembled. This enables low production and assembling costs. According to some embodiments, conventional compression springs and/or elastomers are used rather than disc springs for the damping assembly 330. Another alternative is to replace the spring system with a piston rod and use hydraulic fluid to obtain/apply loads.

According to some embodiments, the outer housing 318 has in front a tongue and groove interface to the ship structure to take vertical and side forces of the turret, as will be described in further detail, infra.

Figures 1, 4:
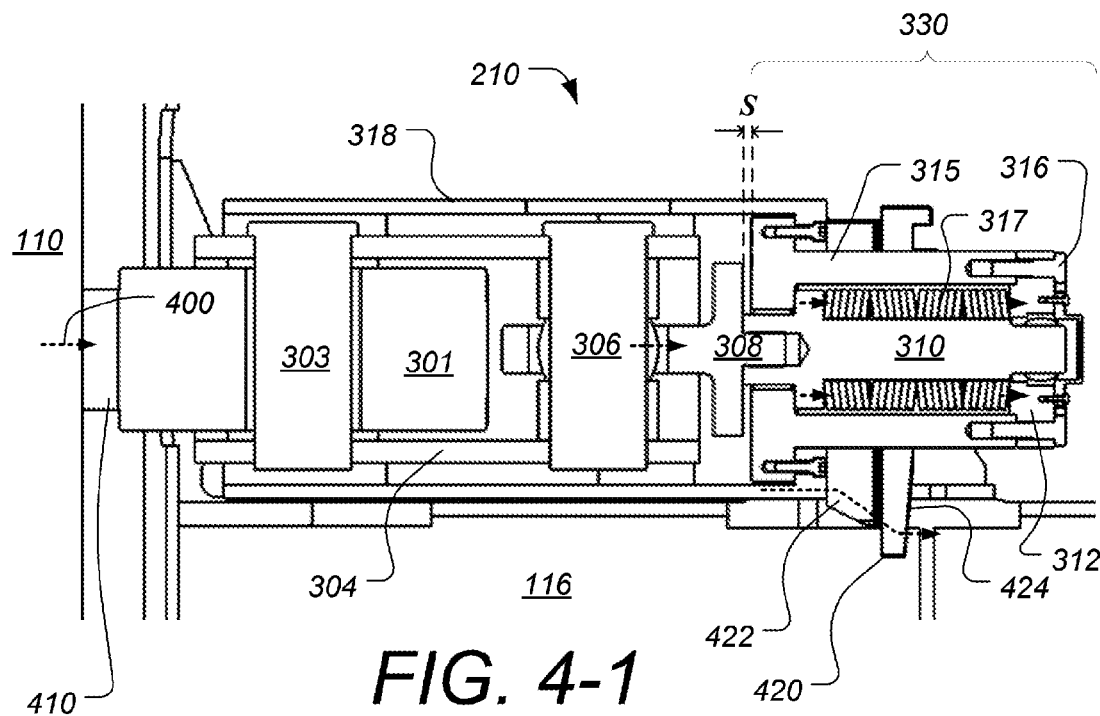
Figures 2, 4:
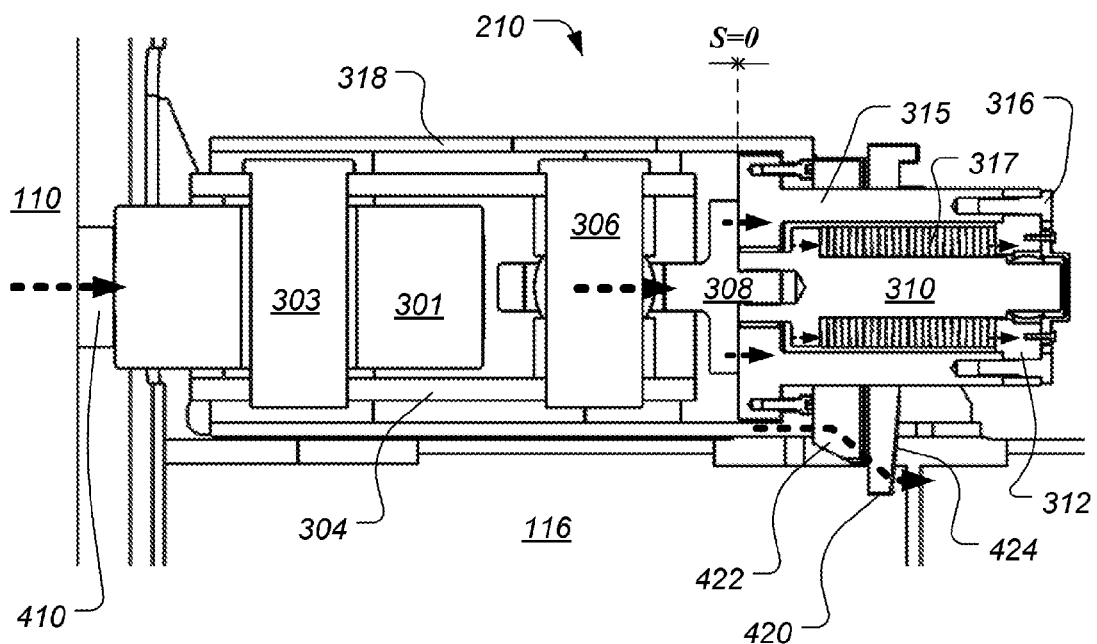

FIGS. 4-1 and 4-2 are cross sectional views illustrating aspects of a bearing cartridge used for supporting a rotatable turret on a vessel, according to some embodiments. Referring to FIG. 4-1, radial turret forces (e.g. due to movement, tolerances, and/or ovality) press radial turret rail 410 away from the central axis of turret 110, as shown by dotted arrow 400. Wheel 301 and inner box 304 slide backwards, and the disc springs 317 are compressed. The load is then transferred through the disc springs 317, via the spring housing lid 312, through spring housing 315 and into the outer housing 318. The force is passed through wedge supports 422 and main wedges 420 into the vessel structure 116, as shown by the dotted arrows. Note that the maximum compression distance of the damping system 330 is the gap s between the flange of rod end 308 and front of the spring housing 315.

Referring to FIG. 4-2, when the maximum compression for damping system 330 is reached (i.e. s=0), any additional increasing load goes from flange of rod end 308 through the front of spring housing 315 and into the outer housing 318, wedge supports 422 and main wedges 420. This configuration prevents overloading on the spring housing bolts 316 and spring housing lid 312.

In the described embodiments, the horizontal load from the wheel/spring system is going via the outer housing 318 and then through a pair of wedge assemblies (422 and 420) into the cartridge support structure 116. This reduces the need for vertical fastening bolts. Furthermore, the few vertical fastening bolts that are used are not exposed to any large shear forces. The main wedges 420 have sloped interfaces 424 to the cartridge support structure 116, making it easy to make fine adjustments in the horizontal position of cartridge system 210, by moving the wedges 420 up or down.

Figure 5:
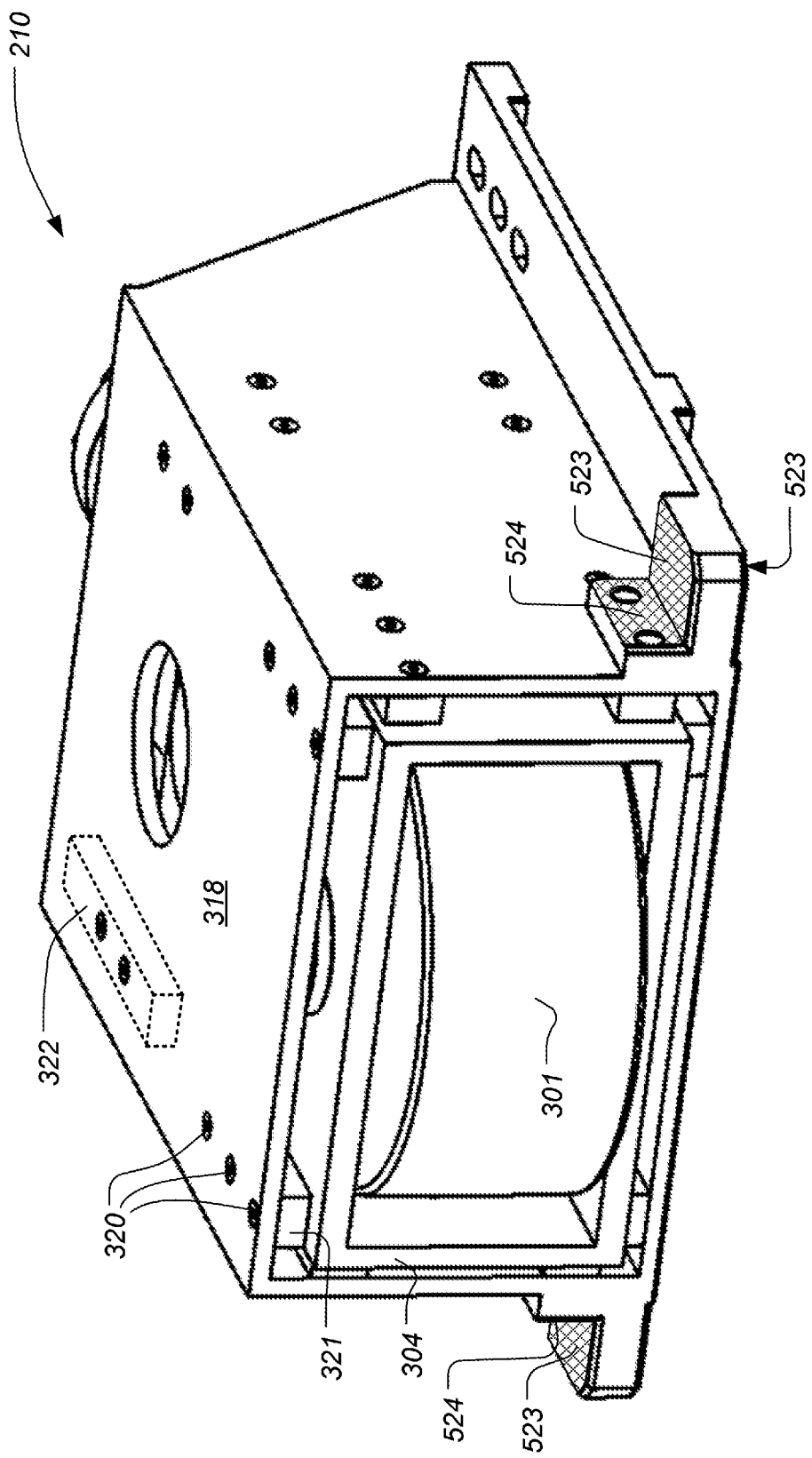
FIG. 5 is a perspective view showing further aspects of a bearing cartridge used for supporting a rotatable turret on a vessel, according to some embodiments.

FIG. 5 is a perspective view showing further aspects of a bearing cartridge (e.g., bearing cartridge 210) used for supporting a rotatable turret on a vessel, according to some embodiments. Visible in FIG. 5 on bearing cartridge 210 are a number of plain linear bearing plates are fastened by bolts close to the inner corners of the outer housing 318, such as plain bearing 321 fastened by bolts 320. In the embodiment shown in FIG. 5, a plurality of first linear bearing plates (such as bearing plate 321) are placed in front, and a plurality of second linear bearing plates in the back (such as bearing plate 322). The plates fix the inner box 304 in vertical and lateral directions. According to some embodiments, the bearing plates can be made of a softer material (for example bronze, brass alloys etc.). According to some alternative embodiments, matching hard metal plates (stainless steel etc.) are fastened to the inner box 304. According to some other alternate embodiments, the soft material plates are fastened to the inner box 304 and the hard plates (if used) are fastened to the outer housing 318. According to some embodiments, in front of the outer housing 318 there are a plurality of fine machined surfaces for ship interface mounting: namely horizontal bearing surfaces 523 and vertical bearing surfaces 524.

Figure 6:
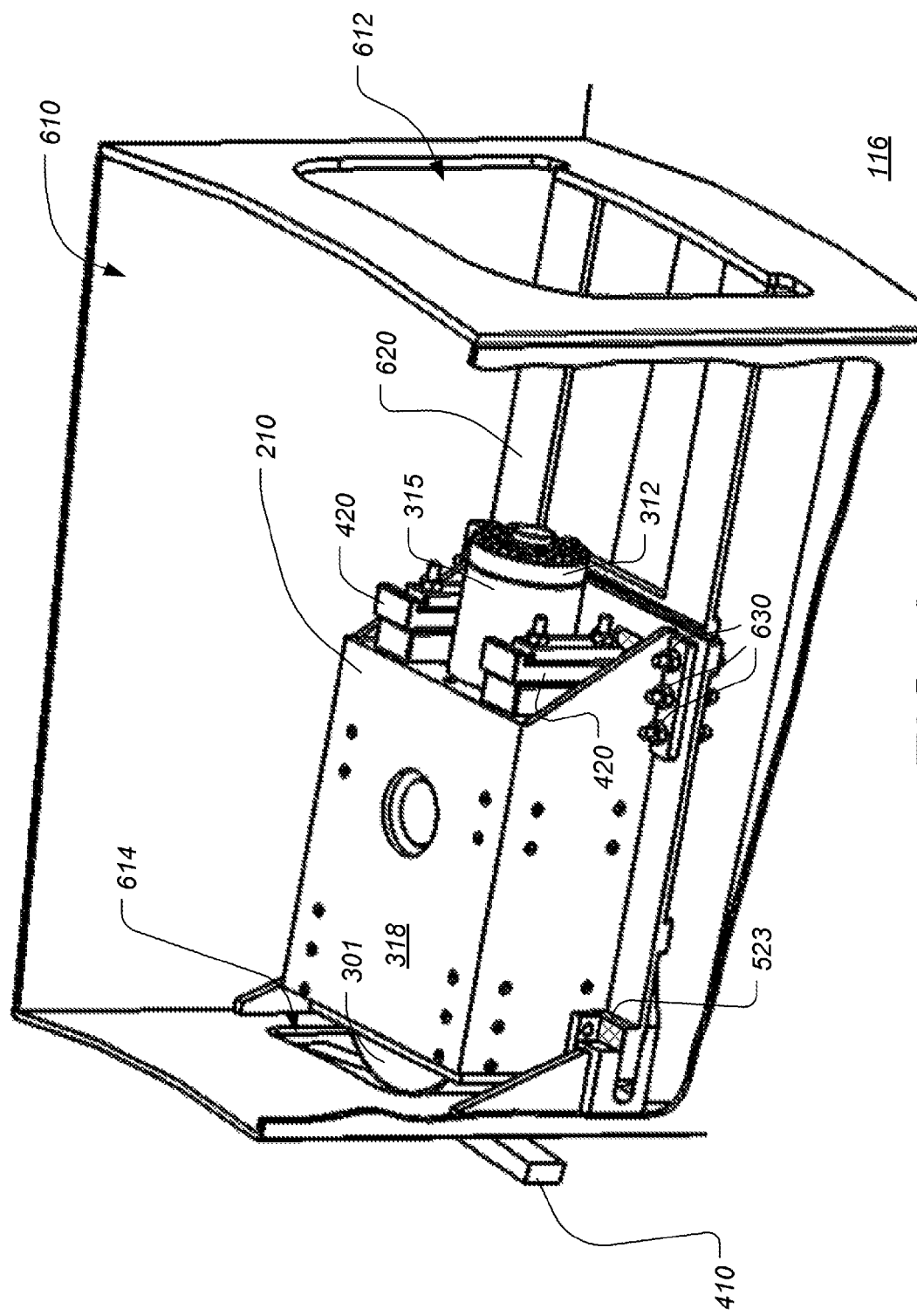
FIG. 6 is a perspective view of a bearing cartridge installed on a cartridge support structure in a vessel, according to some embodiments.

FIG. 6 is a perspective view of a bearing cartridge installed inside a cartridge support structure in a vessel, according to some embodiments. Bearing cartridge 210 is shown mounted in a cell 610 that forms part of surrounding vessel structure 116. More particularly, in this example, cell 610 is formed on the deck of the vessel and has four walls. The sidewalls are solid, the rear wall has a large access window 612 and the front wall as a smaller wheel window 614. When bearing cartridge 210 is installed on cartridge support structure 620 within cell 610, the wheel 301 protrudes through window 614 and contacts outer annular rail 410 of the turret 110. Also visible in FIG. 6 are rear fastening bolts 630 used to secure bearing cartridge 210 to cartridge support structure 620. Note, as will be described in further detail infra, no fastening bolts are used to secure the front end of bearing cartridge 210 to support structure 620.

Figure 7:
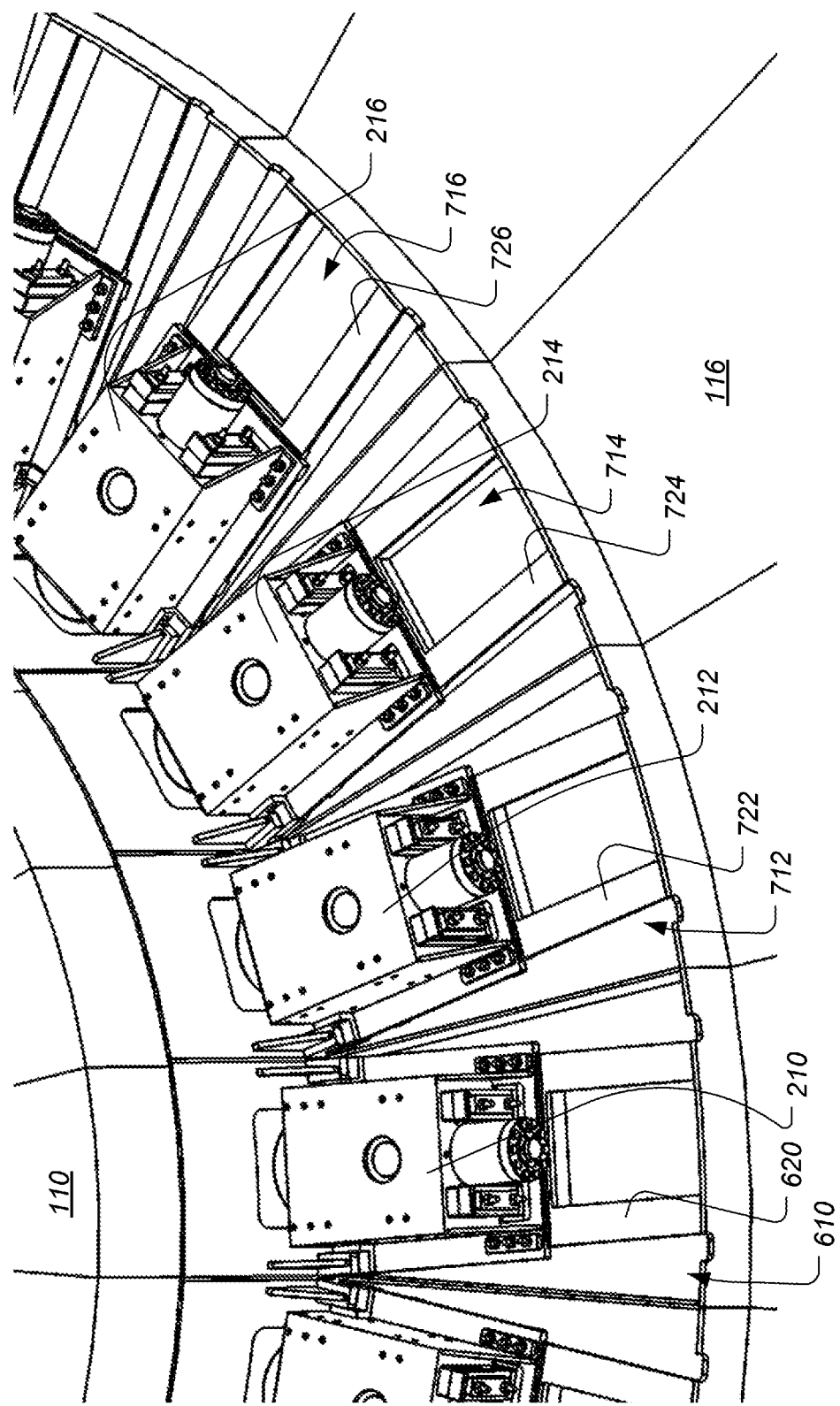
FIG. 7 is a perspective view of several bearing cartridges installed on a vessel, according to some embodiments.

FIG. 7 is a perspective view of several bearing cartridges installed on a vessel, according to some embodiments. As can be seen, bearing cartridges 210, 212, 214 and 216 are installed on support structures 620, 722, 724 and 726 respectively, which are positioned in cells 610, 712, 714 and 716 respectively.

Figure 8:
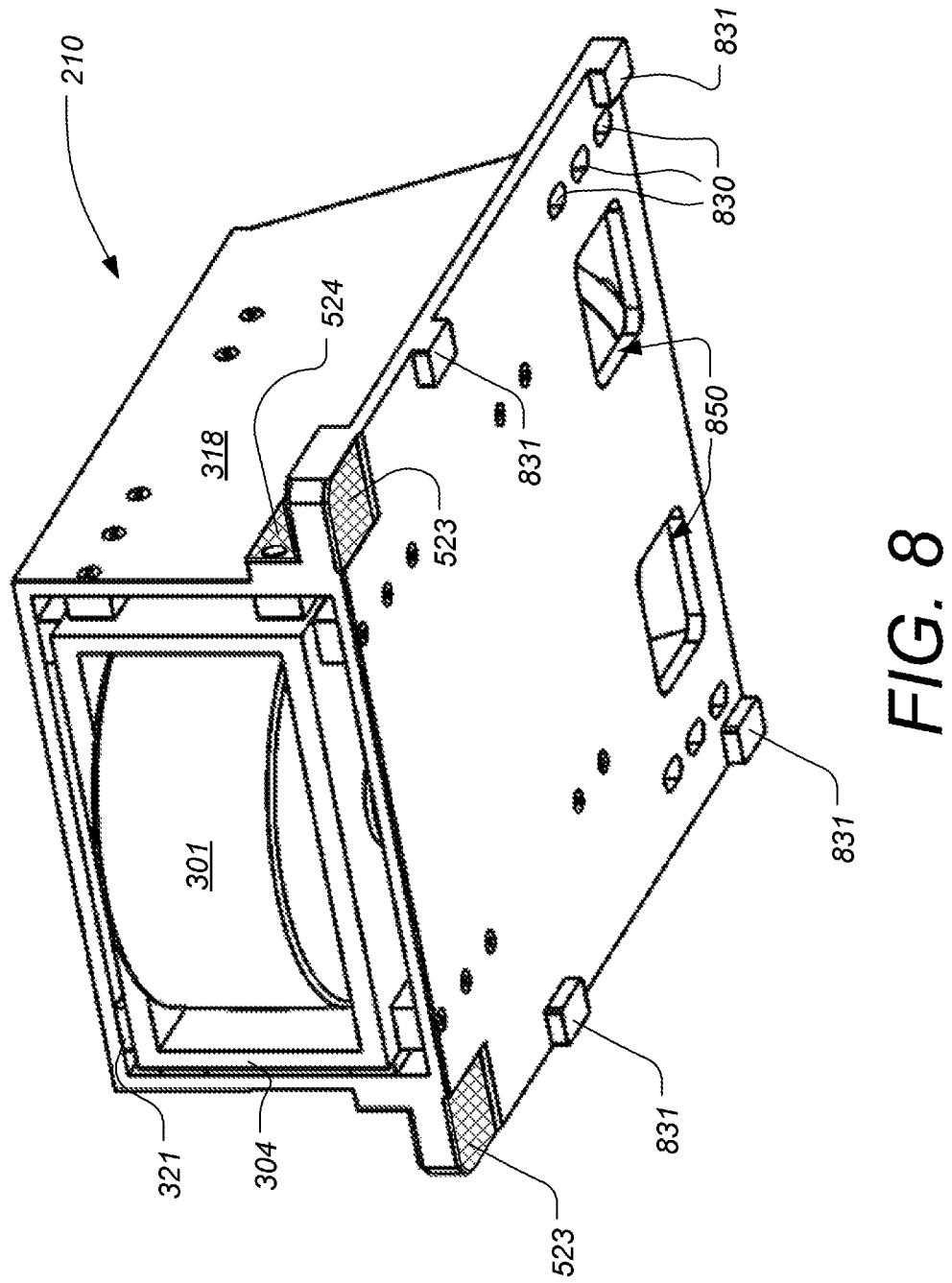
FIG. 8 is a perspective view showing further aspects of a bearing cartridge used for supporting a rotatable turret on a vessel, according to some embodiments.

FIG. 8 is a perspective view showing further aspects of a bearing cartridge used for supporting a rotatable turret on a vessel, according to some embodiments. Visible on the underside of bearing cartridge 210 are four ribs 831 that are positioned to fit just outside of the cartridge support structure rails (not shown) to provide for easy mounting and guiding of the bearing cartridge 210. Also visible on the underside of cartridge 210 are two large windows 850 into which wedge supports 422 and main wedges 420 protrude when cartridge 210 is mounted. Two sets of three slotted holes 830 are also visible through which rear fastening bolts 630 (not shown) can pass.

Figures 1, 9:
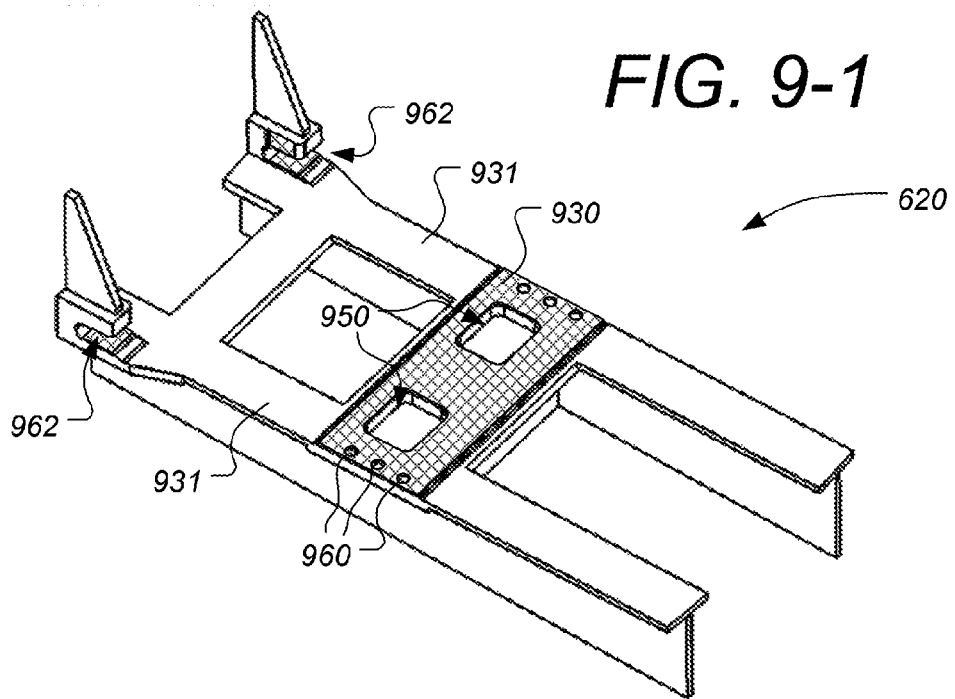
Figures 2, 9:
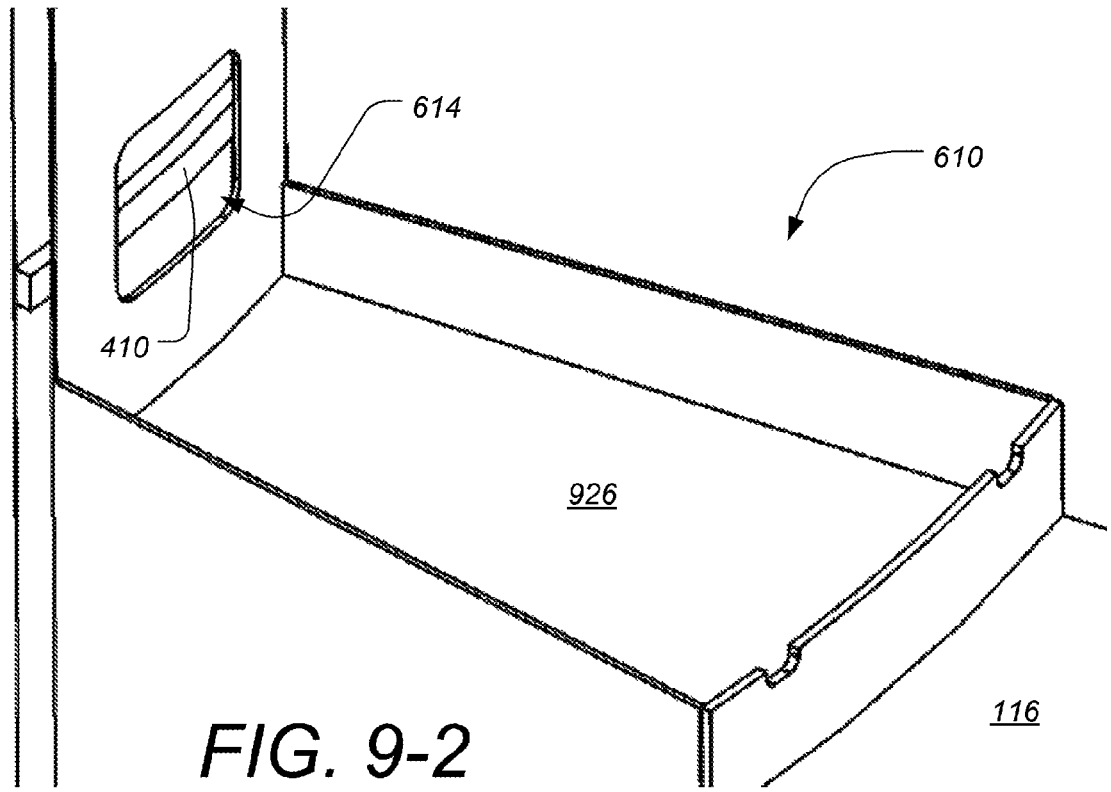
Figures 3, 9:
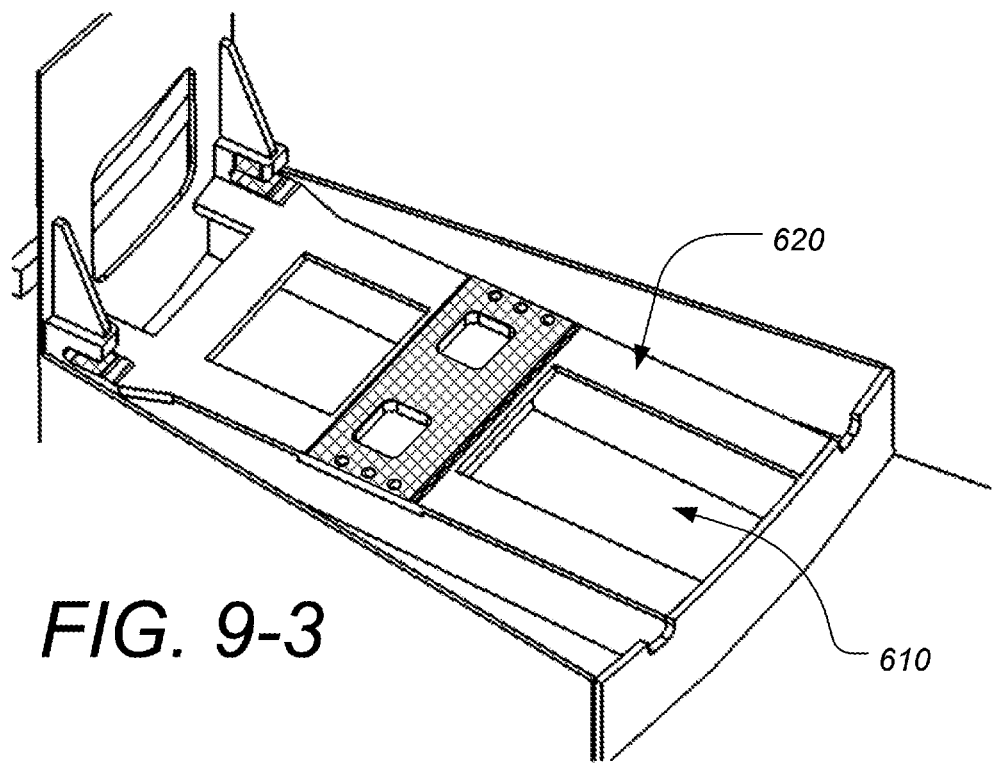
Figures 4, 9:
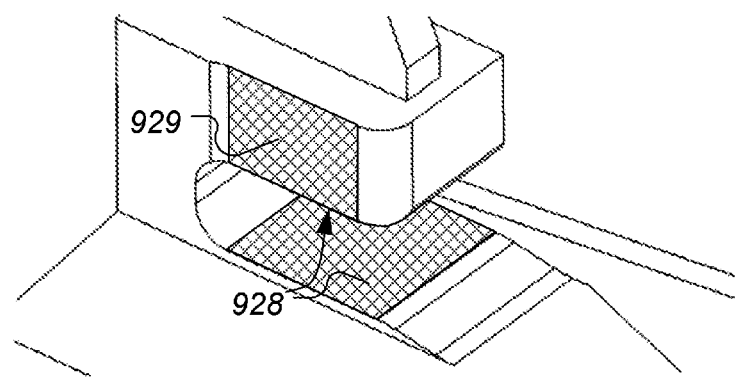

FIGS. 9-1, 9-2, 9-3 and 9-4 are perspective views showing further aspects of a cartridge support structure and vessel structure onto which a bearing cartridge can be mounted, according to some embodiments. FIG. 9-1 shows a support structure 620 which will be mounted (e.g. by welding) to a ship deck (not shown), before mounting the bearing system. In the front of the support structure 620 is a plurality of fine-machined surfaces within slots 962 and on the two inner side surfaces, as will be described in further detail, infra. The machined surfaces associated with slots 962 will fix the bearing cartridge vertically and laterally when mounted. According to some embodiments, in the middle of the support structure 620 a fine-machined surface 930 is formed where the rear bottom of the bearing cartridge will rest and be fastened by bolts and wedges. The structure 620 also has two large holes 950 to accommodate the wedge supports 422 and main wedges 420 when the bearing cartridge is mounted. Also visible are bolt holes 960 through which rear fastening bolts can pass. Note that the spacing of the outer edges of the rails 931 are dimensioned to match the small ribs 831 on the under side of the bearing cartridge (as shown in FIG. 8). The use of the ribs 831 and rails 931 further ease the mounting and guiding of the bearing cartridge to the support structure 620. FIG. 9-2 shows a portion of the cell 610 (with walls shortened for clarity) into which the support structure 620 is welded. Note that according to some embodiments, the floor of the cell 610 is ship deck 926 which forms part of surrounding vessel structure 116. FIG. 9-3 shows the support structure 620 mounted (e.g. by welding) into cell 610 prior to mounting the bearing cartridge. FIG. 9-4 shows further details of slots 962. In the example shown, there are four horizontal fine-machined surfaces 928 (upper and lower for each slot) and two vertical fine-machined surfaces 929 (on the inner sides slot-arm). Surfaces 928 and 929 will contact surfaces 523 and 524, respectively (which are visible in FIGS. 5 and 8).

Figures 1, 10:
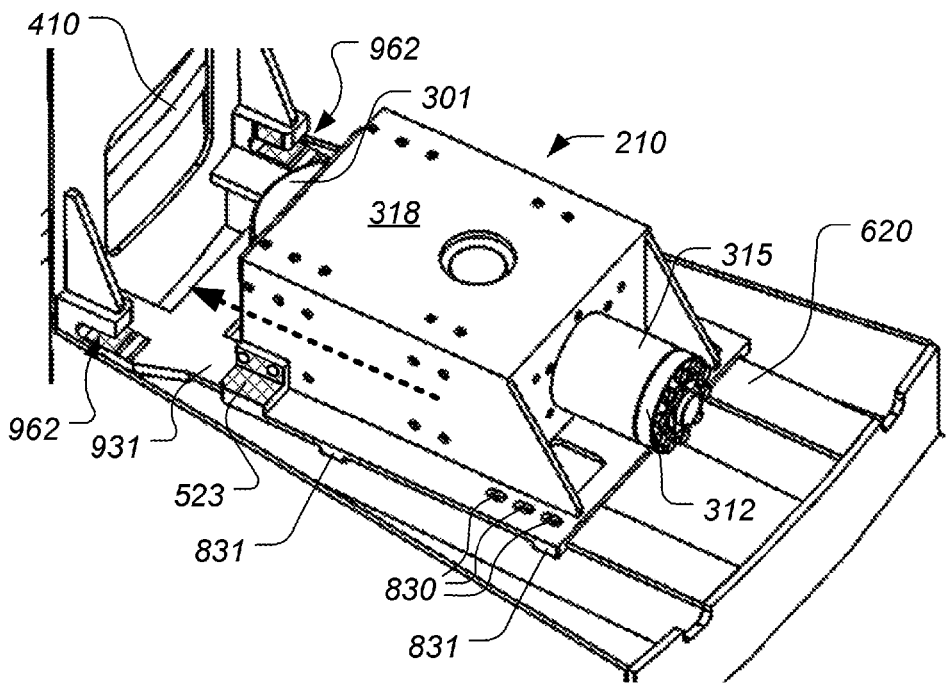
Figures 2, 10:
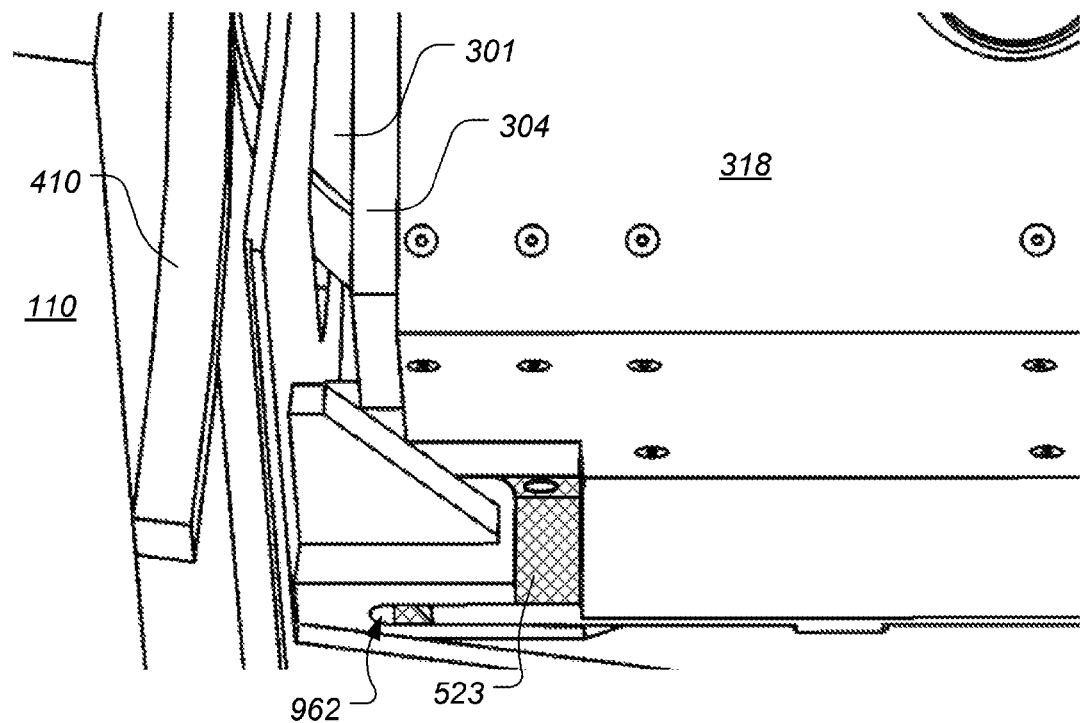
Figures 3, 10:
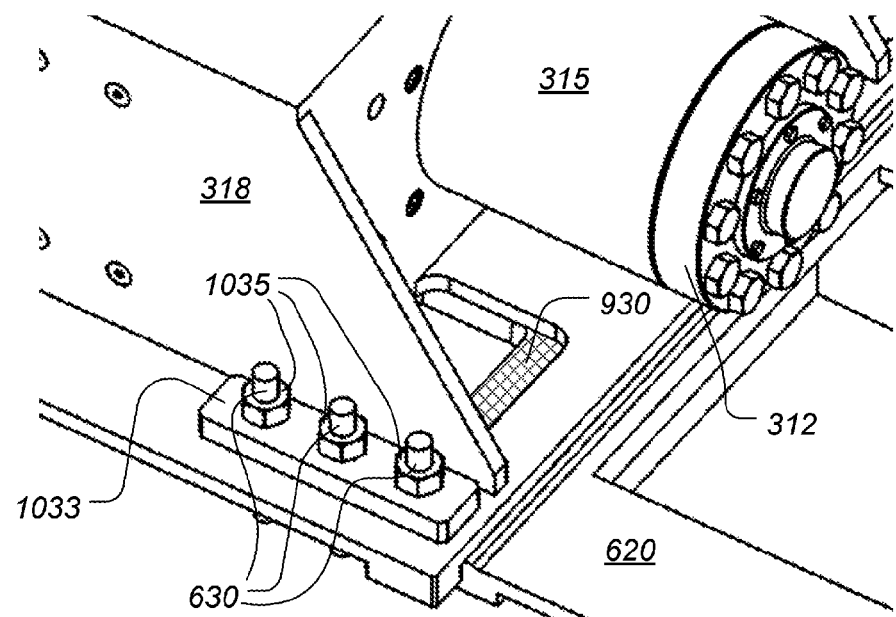
Figures 4, 10:
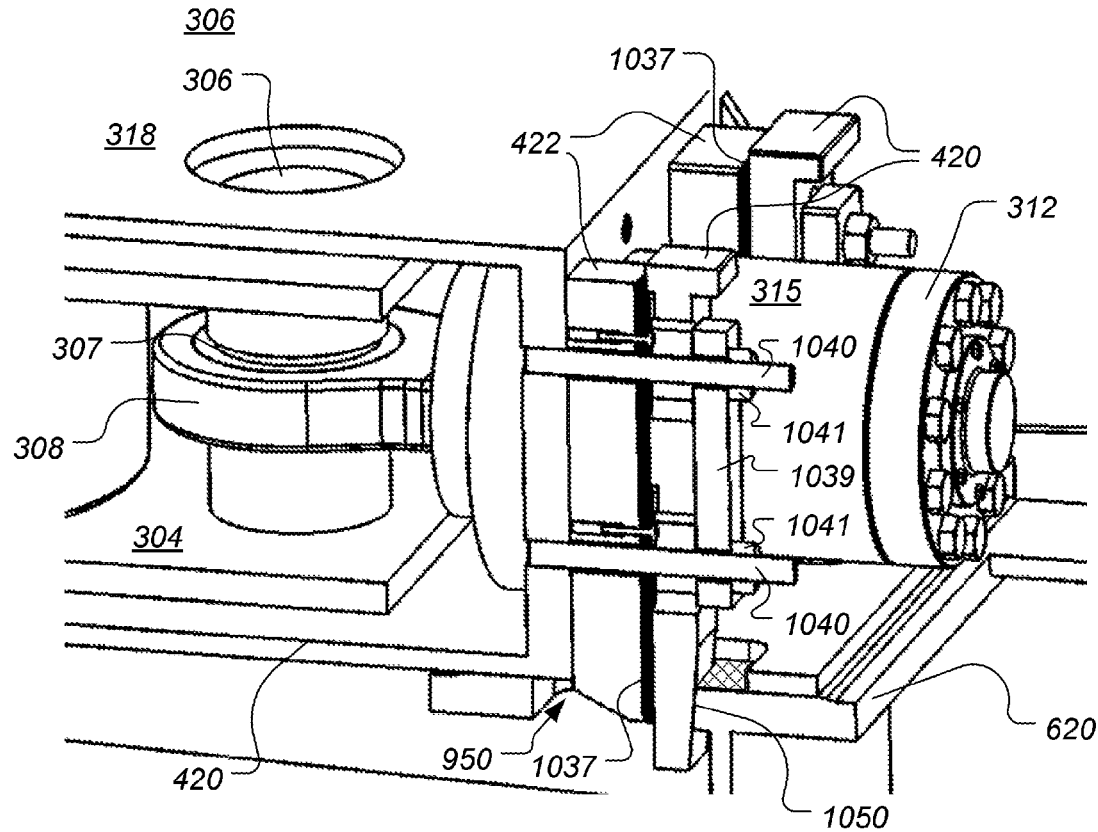

FIGS. 10-1, 10-2, 10-3 and 10-4 are perspective views showing further aspects of mounting a bearing cartridge to a support structure in a vessel, according to some embodiments. FIG. 10-1 shows the bearing cartridge 210 being positioned on the support structure 620 after which it is slid forward as indicated by the dotted arrow. Note that the downward protruding ribs 831 fit just outside the outside edges of rails 931, so as to aid in the positioning of bearing cartridge 210. FIG. 10-2 shows a desired position for the wheel 301 in relation to contacting the outer annular rail 410 of the turret 110. Note that the exact desired position depends on the application and design of the system. For example, the desired position might be preloaded, where the wheel 301 touches the rail 410, and the outer housing 318 is moved even closer to turret center so as to compress the damping system a predetermined amount. According to some embodiments, the desired position may be the wheel 301 just touching rail 410 (which is shown in FIG. 10-2). According to some other embodiments, the desired position may be where the wheel 301 is spaced a predetermined distance (e.g. a few millimeters) from rail 410. This positioning may be desirable, for example, due to tolerances and/or ovality. Note that slotted bolt holes 830 (visible in FIG. 10-1) in the outer housing 318 can be used for adjustment purposes. Visible in FIG. 10-3 is bolt bracket 1033 placed over the holes 830 and then fastened by bolts 630 and nuts 1035. The bolts 630 keep the rear end of the cartridge 210 fixed vertically and laterally, but do not have to be designed to take large radial forces due to the wedge supports 422 and main wedges 420 as shown in FIG. 10-4. FIG. 10-4 is a cross-section view through wedge support 422, shim 1037 and main wedge 420 on the near side (or left side) of the cartridge. The tapered or wedge-shape of main wedge 420 is apparent in FIG. 10-4, as is a matching shape on the sidewall 1050 of hole 950 in support structure 620 that is engaged by main wedge 420.

After the rough position of bearing cartridge 210 on support structure 620 is made, the wedge assemblies are installed, according to some embodiments. According to some embodiments, the wedge assembly includes a wedge support 422, one or more shim plates 1037 (for larger adjustments), a main wedge 420, a bolt plate 1039, bolts 1040 and nuts 1041. The main wedges 420 have slotted (or oblong) boltholes and a slope interface surface which engages the rear edge of holes 950 of support structure 620. The radial placement of the cartridge 210 can be finely adjusted by moving the main wedges 420 up or down before the final tightening of all the fastening parts. Heavy radial (and lateral) loads onto the bearing cartridge 210 from the turret 110 in operation will mainly pass through the outer housing 318, then into the lower part of the wedge assemblies and then into the support structure 620 and deck/ship walls in surrounding vessel structure 116. In this way, the vertical bolts 630 do not take any large sheer forces.

According to some embodiments, the described bearing system allows relatively rough internal tolerances and alignment features for the inner parts of the bearing cartridge. The cartridge can be pre-mounted and/or the spring system preloaded. The cartridge-type mounting in the vessel allows for quick and easy mounting and/or dismounting in the vessel. The design also allows for easy fine-tuning of the radial position of the bearings in the vessel. The radial forces are transferred from bearing cartridge to vessel via wedges, with no large shear forces placed on interface bolts. The tongue-and-groove-type interface between the ship structure and the front end of the bearing cartridge are configured to take vertical forces and lateral forces while using very few interface bolts. The system described is thus also configured for easy inspection and/or lubrication of the wheels and turret rail.

While the subject disclosure is described through the above embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. A bearing system configured to support rotation of a turret carried by a vessel, the rotation of the turret relative to said vessel being about a substantially vertical turret axis and the turret having a bearing surface, the bearing system comprising:
    a plurality of bearing assemblies, each of which comprising:
        a roller in contact with said turret bearing surface;
        a linkage system configured to transmit force from said bearing surface toward said roller into a supporting structure of said vessel; and
        a mounting system configured to mount said bearing assembly to said supporting structure, the mounting system including one or more wedge-shaped members shaped to position the bearing assembly with respect to the supporting structure and positioned to transmit force from said linkage system to said supporting structure.

2. The bearing system of claim 1, wherein the bearing assembly is a substantially prefabricated cartridge-type subassembly configured for installation and/or removal from said supporting structure.

3. The bearing system of claim 2, wherein said prefabricated subassembly is fastened to said supporting structure using no more than ten bolt fasteners.

4. The bearing system of claim 1, wherein said linkage system comprises a compression spring system configured to allow movement of said roller in a direction perpendicular to the bearing surface.

5. The bearing system of claim 4, wherein said linkage system is configured such that when the spring system is not compressed to a maximum position, force from the bearing surface towards the roller passes through the spring system into a spring end piece, and when the spring system is compressed to the maximum position, further force from the bearing surface towards the roller passes directly through the linkage system to said supporting structure without increasing a load on the spring end piece.

6. The bearing system of claim 4, wherein the linkage system comprises one or more linkage elements configured to allow freedom of movement of linkage elements in directions parallel to the turret bearing surface.

7. The bearing of claim 1, wherein said bearing surface faces downwards and said bearing assemblies are axial bearing assemblies.

8. The bearing system of claim 1, wherein said bearing surface is an outer annular rail secured about an outer circumference of said turret and said bearing assemblies are radial bearing assemblies.

9. The bearing system of claim 1, wherein said roller includes an outer roller surface configured to contact the bearing surface and said outer roller surface is curved in a direction parallel to a central rotating axis of the roller.

10. The bearing system of claim 1, wherein said mounting system comprises one or more slidably mating thread-free mounting elements configured to restrain movement of at least a front portion of said bearing assembly with respect to said supporting structure.

11. The bearing system of claim 10, wherein said slidably mating thread-free mounting elements include one or more tongue elements protruding from an outer housing of the bearing assembly that are configured to mate with one or more groove elements on said supporting structure.

12. The bearing system of claim 1, wherein said vessel is configured to receive hydrocarbons produced from subsea subterranean reservoirs.

13. The bearing system of claim 12, wherein the vessel is a floating production, storage and offloading vessel.

* * * * *